United States Patent [19]
Fukushima et al.

[11] Patent Number: 5,193,960
[45] Date of Patent: Mar. 16, 1993

[54] WASHER WITH ELASTIC WATER-SWELLABLE RUBBER

[75] Inventors: Takuo Fukushima; Isamu Ichizuka; Hiroshi Inoue; Tokio Ueno, all of Tokyo, Japan

[73] Assignee: Asahi Denka Kogyo Kabushiki Kaisha, Tokyo, Japan

[21] Appl. No.: 784,986

[22] Filed: Oct. 30, 1991

[30] Foreign Application Priority Data

Nov. 6, 1990 [JP] Japan .................. 2-116613[U]

[51] Int. Cl.$^5$ .................. F16B 33/00; F16B 43/02
[52] U.S. Cl. .................. 411/542; 411/369; 411/902; 285/925; 277/DIG. 6
[58] Field of Search .............. 411/542, 544, 533, 369, 411/370, 902, 903, 915; 277/233, 234, 235 R, DIG. 6; 285/925

[56] References Cited

U.S. PATENT DOCUMENTS

| | | | |
|---|---|---|---|
| 2,445,273 | 7/1948 | Kennedy | 285/925 |
| 3,168,321 | 2/1965 | Glicksman | 411/915 |
| 3,606,357 | 9/1971 | Yonkers | 411/915 |
| 3,670,618 | 6/1972 | Jellison | 411/369 |
| 3,915,460 | 10/1975 | Kramer | 285/925 |
| 4,712,802 | 12/1987 | Hewison et al. | 411/542 |
| 5,096,206 | 3/1992 | Andre et al. | 277/DIG. 6 |

FOREIGN PATENT DOCUMENTS

| | | | |
|---|---|---|---|
| 61-034087 | 2/1986 | Japan . | |
| 46390 | 2/1990 | Japan | 285/925 |
| 3-107608 | 5/1991 | Japan . | |

Primary Examiner—Neill R. Wilson
Attorney, Agent, or Firm—Frishauf, Holtz, Goodman & Woodward

[57] ABSTRACT

A washer system comprising: an annular washer having a central opening and an annular packing member which is coaxially arranged with the annular washer, at least a portion of the annular packing member being arranged within the central opening of the annular washer; at least a portion of the outer surface of the annular washer being rust-proofed treated. A substantial portion of a contacting surface between the annular washer and the annular packing member is not rust-proofed treated. The annular packing member is made of an elastic water-swellable rubber. The annular packing member has a portion which extends radially outwardly from a portion of the annular washer defining the central opening, and contacts a portion of a lower substantially flat surface of the annular washer radially outwardly of the annular opening. The annular packing member has a portion extending below a lower substantially flat surface of the annular washer. The annular washer and the annular packing member are adhered together by a vulcanized adhesive.

10 Claims, 2 Drawing Sheets

WASHER WITH ELASTIC WATER-SWELLABLE RUBBER

BACKGROUND OF THE INVENTION

1. Field of the Invention

This invention relates to a washer with an elastic water-swellable rubber which is used as a water sealing device when two segments are connected by a bolt at junctions thereof, or in similar cases.

2. Description of the Prior Art

Concrete segments are widely used for constructing architectural structures such as tunnel, etc. These concrete segments are gradually assembled in such a manner by being connected by a bolt at junctions and are serve as component elements for constructing such architectural structures as tunnels, etc.

Water sealing devices are often used together with a bolt in order to water seal the junctions when the concrete segments are connected by a bolt. As one example of a water sealing device used in such instance as just mentioned, there is a water sealing packing member disclosed in, for example, Japanese Utility Model Early Laid-open Publication No. Sho 62-133019. This water sealing packing member is used for water sealing the surrounding area of the bolt, and comprises a disc washer and an annular packing member axially aligned with each other and integrally formed by fitting the packing member into the washer or fixing them by adhesive. The Japanese Publication also discloses that the annular packing member is preferably formed of an elastic water-swellable composition.

However, where the conventional water sealing packing member is used as a water sealing device of concrete segments, there was such problems as that the washer used together with the water sealing packing member suffered from serious corrosion over the passage of years, because of the circumstances under which it is used are usually bad.

Moreover, there were such problems as that the water sealing function is not sufficient, because the integral connection between the washer and the water sealing packing member is not necessarily perfect.

SUMMARY OF THE INVENTION

An object of the present invention is to provide a washer with an elastic water-swellable rubber which does not suffer from corrosion even if it is used under bad circumstances and which is capable of securely tightening the junctions of a washer and a packing member to exhibit a reliable water sealing function.

The present invention has achieved the above object by providing a washer with an elastic water-swellable rubber comprising an annular washer, and an annular packing member aligned and overlapped with said annular washer and partly fitted in a perforation formed in said annular washer, said annular washer being subjected to a rust-proof treatment on a surface thereof, except for a large part of its contacting surface relative to said annular packing member. The annular packing member being formed of an elastic water-swollen rubber, and said annular washer and said annular packing member being adhered together by a vulcanized adhesive.

According to the present invention, when the segments are tightened at their junctions using a bolt having the washer with an elastic water-swollen rubber, a tiny gap, which is usually formed between the bolt and the junctions, can be water sealed by the washer with an elastic water-swellable rubber. Furthermore, even when it is used under bad circumstances, it can maintain a sufficiently reliable water sealing function without suffering from corrosion. In addition, since the annular packing member is swollen by water to fill-up the tiny gap formed around the bolt tightening portion, the bolt tightening portion can be more perfectly water sealed.

DETAILED DESCRIPTION OF THE EMBODIMENT

The present invention will be described hereinafter with reference to FIGS. 1 through 3.

Figure 1:
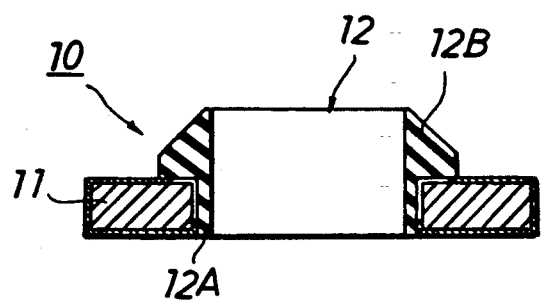
FIG. 1 is a sectional view showing one embodiment of a washer with an elastic water-swellable rubber according to the present invention.
Figure 2:
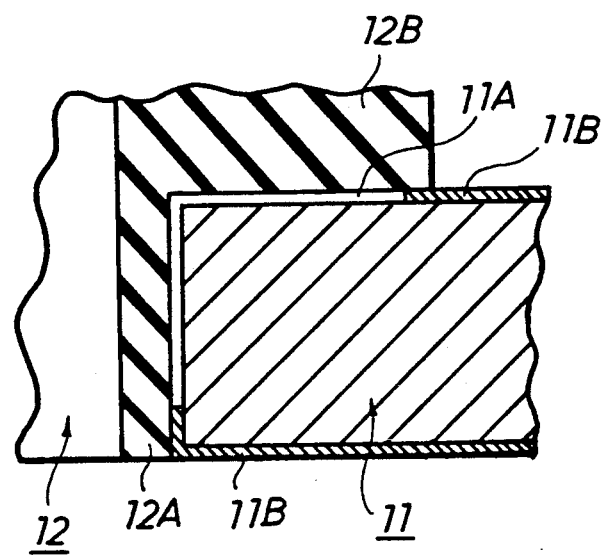
FIG. 2 is a sectional view showing a part of the washer with an elastic water-swellable rubber shown in FIG. 1, on an enlarged scale.

A washer 10 with an elastic water-swellable rubber, as shown in FIG. 1, comprises an annular washer 11 and an annular packing member 12 axially aligned and overlapped with the annular washer 11 and partly fitted in a perforation formed in the annular washer 11. The annular packing member 12, as shown in FIG. 1, is formed of an elastic water-swellable rubber, and a part of the member 12 has a cylindrical thin wall configuration. More specifically, this annular packing member 12 comprises a cylindrical thin wall fit-in portion 12A to be fitted into the aperture of the washer 11 and contacted at its outer peripheral surface with the inner peripheral surface of the washer 11, and a cylindrical thick wall portion 12B continuously formed next to the fit-in portion 12A and overlapped at its inner peripheral edge portion with the washer 11. Both the portions 12A and 12B define a through-hole or aperture having an inner peripheral surface to be contacted with an outer peripheral surface of a bolt.

The annular washer 11 is subjected to rust-proof treatment on a surface thereof, except a large part 11A of its contacting surface relative to the annular packing member 12. In other words, as shown in FIG. 2, the annular washer 11, which is aligned and overlapped with the annular packing member 12, is provided with a rust-proof treatment portion 11B having a rust-proof treatment on the area starting from its outer surface to a slightly inner side of its contacting surface relative to the annular packing member 12, i.e., in the vicinity of the distal end of the fit-in portion 12A, as well as the outer peripheral portion of the overlapped portion 12B. A large part of the remaining contacting surface forms a non-rust-proof treatment portion 11A (the portion not hatched in FIG. 2). The annular washer 11 and the annular packing member 12 are adhered together at contacting surfaces thereof by a vulcanized adhesive and thus integrally formed. The washer 10 with an elastic water-swellable rubber constituted by integrally adhering together the annular washer 11 and the annular packing member 12 in the manner as mentioned above, has, as shown in FIG. 3, an inner diameter matching with the outer diameter of a bolt 20 to be used. Accordingly, when the bolt 20 is inserted into the washer 10 with an elastic water-swellable rubber, the entire inner peripheral surface of the annular packing member 12 is readily contacted with the outer peripheral surface of the bolt 20.

The annular washer 11 of this washer 10 with an elastic water-swellable rubber is subjected to rust-proof treatment as mentioned above. This rust-proof treatment is made by a TEFLON coating, or a coating of a general rust-proof coating material. In view of rust-proof effect, however, the TEFLON coating is preferable.

The elastic water-swollen rubber forming the annular packing member 12 of washer 10 with an elastic water-swellable rubber is not particularly limited as long as the rubber has the properties of being swollen when it absorbs water. Acceptable elastic water-swellable rubbers include, for example, a mixture of such known water-absorbing polymers as elastic water-swellable polyurethane resin or starch/acrylic acid graft copolymer and crosslinked poly (sodium acrylate) mixed with rubbers such as natural rubbers, synthetic rubbers and reclaimed rubbers. Among them, a flexible substance including elastic water-swollen polyurethane resin is preferable.

It is preferable that the composition of the flexible substance may be controlled in such a manner as to give a water-swelling ratio of the resulting molded article of 10 to 350%, still preferably 40 to 250%.

The flexible substance including a water-swollen polyurethane resin as described above may be obtained by kneading one or more polyether polyols of the following general formula together with urethane polymer(s) having terminal isocyanate groups obtained from polyisocyanate, a crosslinking agent and the rubber as defined above followed by curing

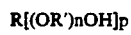

R[(OR')nOH]p wherein R represents a polyhydric alcohol residue; (OR') represents a polyoxyalkylene chain comprising oxyalkylene groups each having an oxyethylene group and an alkylene group carrying three or four carbon atoms, provided that the content of the oxyethylene groups amounts to 20 to 100% of the total molecular weight;

n is a number corresponding to the degree of polymerization of the oxyalkylene groups and giving a hydroxyl group equivalent of 200 to 2500; and p is a number of 2 to 8, preferably 2 to 4;

Said polyether polyols may be obtained by adding alkylene oxide(s) to said polyhydric alcohols in such a manner as to give the desired molecular weight. Either random or block addition may be employed therefor.

Examples of said polyhydric alcohol include dihydric alcohols such as ethylene glycol and propylene glycol; trihydric alcohols such as glycerol and trimethylolpropane; tetrahydric alcohols such as erythritol and pentaerythritol; pentahydric alcohols such as arabitol and xylitol; and hexahydric alcohols such as sorbitol and mannitol.

When the content of the oxyethylene groups is less than 20%, the resulting material is unsatisfactory as a water-proofing material. The urethane polymer has terminal isocyanate groups. Any polyisocyanates may be employed. The content of the terminal isocyanate groups may be 1 to 12%, preferably 2 to 7%.

Examples of said crosslinking agent include polyols and polyamines each carrying two to six active hydrogen atoms per molecule and has an average molecular weight per active hydrogen atom of 30 to 15,000, for example, low-molecular weight polyols, addition polymers of low-molecular weight polyols and alkylene oxides, low-molecular weight polyamines, and addition polymers of low-molecular weight polyamines and alkylene oxides, as well as mixtures thereof.

It is preferable that the flexible substance as described above contains 20 to 800 parts of the water-swellable polyurethane resin per 100 parts of the rubber.

Other examples of preferable flexible substances are those obtained by further adding hydraulic material(s) to a composition comprising said water-swellable polyurethane resin and rubber. Examples of available hydraulic materials include Portland cement, blast furnace cement, colloidal cement and gypsum. It is preferable to employ a curing accelerator for cement comprising calcium aluminate simultaneously therewith. A flexible substance comprising such a hydraulic material has an advantage that it shows little shrinkage when dried. It is preferable that the hydraulic material is blended in an amount of 20 to 30 parts per 100 parts of the mixture of the water-swollen polyurethane and rubber.

The above flexible substance may further contain appropriate water-absorbing material(s). Examples of the water-absorbing materials include those mainly comprising an $\alpha,\beta$-unsaturated compound, which carries one or more carboxyl groups or those capable of being derived thereto such as carboxyl, carboxylate, carboxylic limide, carboxylic amide or carboxylic anhydride groups per molecule, and optionally polymerized with other $\alpha,\beta$-unsaturated compound(s) and/or modified with isocyanate(s).

Examples of such a water-absorbing resin include conventional water-absorbing polymers such as starch/acrylic acid graft copolymer, a salt of styrene/maleic anhydride copolymer, crosslinked poly(sodium acrylate), vinyl ester/ethylenically unsaturated carboxylic acids, and saponified products of derivatives thereof.

The flexible substance may be further vulcanized with the use of a crosslinking agent such as sulfur.

The annular washer 11 and the annular packing member 12 in this washer 10 with an elastic water-swellable rubber are fixed together as follows. After a vulcanized adhesive is uniformly applied to the contacting surface of the annular washer 11 relative to the annular packing member 12 using a brush, a sprayer or the like, the solvent of vulcanized adhesive is evaporated to dry the vulcanized adhesive. Then, the annular washer 11 and the annular packing member 12 are fitted together and affixed by a heated vulcanized adhesive or otherwise. The annular packing member 12 is fixed to the annular washer 11 by the vulcanized adhesive at the same time the annular packing member 12 is press molded. A preferable example of the vulcanized adhesive is one belonging to the series of chlorinated rubbers.

Next, one mode for connecting two concrete segments using the washer with an elastic water-swellable rubber will be described with reference to FIG. 3.

Figure 3:
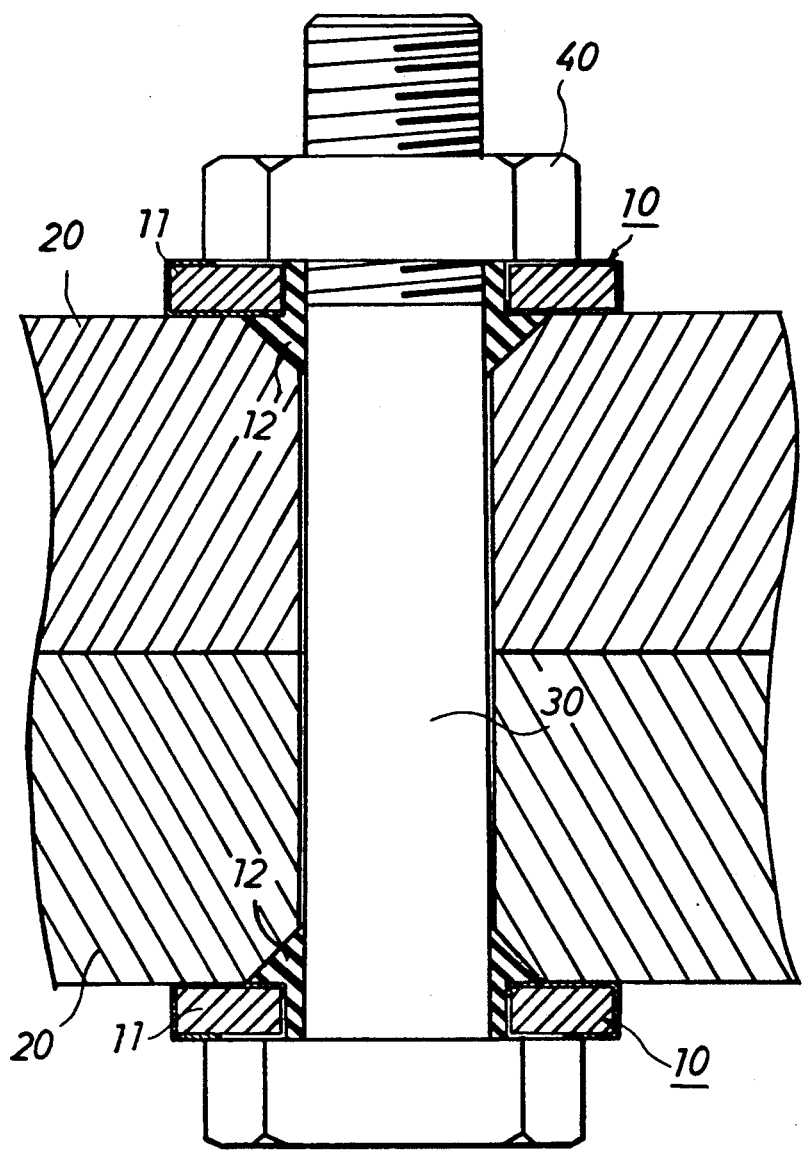
FIG. 3 is a sectional view of an important portion showing two concrete segments connected together by a bolt incorporated with the washer with an elastic water-swellable rubber shown in FIG. 1.

Each of the concrete segments 30 to be connected by the washer 10 with an elastic water-swellable rubber is provided with a bolt hole 30A formed in its junction as shown in FIG. 3. The bolt hole 30A is provided with a tapered portion 30B formed on one side of its opening. The overlapped portion 12B of the annular packing member 12 in the washer 10 with an elastic water-swellable rubber is fitted into this tapered portion 30B.

To connect the concrete segments 30, the concrete segments 30, 30 are first overlapped with each other in such a manner as that the bolt holes 30A, 30A are aligned with each other with the tapered portions 30B, 30B placed on the outer surface side. Thereafter, the bolt 20 having the washer 10 with an elastic water-swellable rubber mounted thereon beforehand is inserted into the concrete segments 30, 30. Then, the overlapped portion 12B of the annular packing member 12 is fitted the tapered portion 30B, and the distal end of the bolt 20 is projected from the concrete segment 30. Another washer 10 with an elastic water-swellable rubber is mounted from the projecting distal end of the bolt 20, and the overlapped portion 12B of the annular packing member 12 is fitted into the tapered portion 30B of the bolt hole 30A. Thereafter, a nut 40 is threadedly engaged with the distal end of the bolt 20 and tightened to connect the concrete segments 30, 30 together. In this way, when two concrete segments 30, 30 are connected together. The annular packing member 12 is compression deformed by the tightening force incurred at that time and intimately attached to the bolt holes 30A, 30A and the tapered portions 30B, 30B of the concrete segments 30A, 30A to seal the surrounding area of the bolt 20. As a result, the bolt tightening portions of the connected concrete segments 30, 30 are water sealed. In a state where the concrete segments 30, 30 are connected together as shown in FIG. 3, when rain water, etc. attempts to enter through the bolt tightening portions in the concrete segments 30, 30, this water is impregnated into the annular packing member 12, which swells the annular packing member 12. As a result, the bolt tightening portions can be water sealed more securely. Further, since the rust-proof treatment portion B reaches the contacting surface of the annular packing member 12, the non-rust-treatment portion A is never exposed to bad circumstances. As a result, the annular washer 11 can be securely prevented from being corroded.

The present invention is not limited to the above embodiment as long as the washer with an elastic water-swellable rubber comprises an annular washer and an annular packing member aligned and overlapped with the annular washer and partly fitted into an aperture formed in the annular washer, the annular washer being subjected to a rust-proof treatment at its surface, excluding a large part of its contacting surface relative to the annular packing member, and the annular washer and the annular packing member being fixed together by vulcanized adhesive. Particularly, the annular packing member can be formed into various configurations as long as it is designed such that a part of the annular packing member is fitted into the aperture of the annular washer and disposed between the bolt and the junction.

The washer with an elastic water-swellable rubber according to the present invention does not corrode even when it is used under bad circumstances, and the washer and the packing member are perfectly integrally formed to securely tighten the junctions. As a result, a highly satisfactory water sealing effect can be obtained.

What is claimed is:

1. A washer system comprising:
  an annular washer having a central opening;
  an annular packing member which is coaxially arranged with said annular washer, at least a portion of said annular packing member being arranged within said central opening of said annular washer;
  at least a portion of the outer surface of said annular washer being rust-proofed treated, wherein a substantial portion of a contacting surface between said annular washer and said annular packing member not being rust-proofed treated;
  said annular packing member being made of an elastic water-swellable rubber;
  said annular packing member having a portion which extends radially outwardly from a portion of said annular washer defining said central opening, and contacting a portion of a lower substantially flat surface of said annular washer radially outwardly of said annular opening;
  said annular packing member having a portion extending below said lower substantially flat surface of said annular washer; and
  said annular washer and said annular packing member being adhered together by a vulcanized adhesive.

2. The washer system as claimed in claim 1, wherein said elastic water-swellable rubber is a flexible substance comprising elastic water-swellable polyurethane resin.

3. The washer system as claimed in claim 2, wherein the composition of said flexible substance is controlled in such a manner as to result in a water-swelling ratio of the resulting molded article of 10 to 350%.

4. The washer system as claimed in claim 3, wherein the flexible substance contains 20 to 800 parts of the water-swellable polyurethane resin per 100 parts of a rubber.

5. The washer system as claimed in claim 4, wherein the flexible substance further contains 20 to 30 parts of a cement material per 100 parts of the water-swellable-polyurethane and the rubber.

6. The washer system as claimed in claim 5, wherein the cement material is selected from the group consisting of Portland cement, blast furnace cement, colloidal cement and gypsum.

7. The washer system as claimed in claim 6, wherein the flexible substance further contains a water-absorbing material comprising an α,β-unsaturated compound.

8. The washer system as claimed in claim 7, wherein the water-absorbing material is selected from the group consisting of a starch/acrylic acid graft copolymer, a salt of a styrene/maleic anhydride copolymer, a cross-linked poly(sodium acrylate), a vinyl ester/ethylenically unsaturated carboxylic acid.

9. The washer system as claimed in claim 8, wherein the vulcanized adhesive comprises a chlorinated rubber.

10. The washer system of claim 1, in combination with an elongated bolt, wherein said annular packing member has an inner diameter such that when said elongated bolt extends therethrough, an outer surface portion of said elongated bolt being in contact with said inner diameter portion of said annular packing member.

* * * * *